(12) United States Patent
Henderson et al.

(10) Patent No.: US 12,546,081 B2
(45) Date of Patent: Feb. 10, 2026

(54) RADIAL BOLT CORRUGATED PIPE MOLD AND ASSEMBLY FOR CEMENTITIOUS FOUNDATIONS, AND METHOD FOR STABILIZATION

(71) Applicants: Allan P Henderson, Bakersfield, CA (US); Charles L Purdy, Desert Hot Springs, CA (US)

(72) Inventors: Allan P Henderson, Bakersfield, CA (US); Charles L Purdy, Desert Hot Springs, CA (US)

(*) Notice: Subject to any disclaimer, the term of this patent is extended or adjusted under 35 U.S.C. 154(b) by 68 days.

(21) Appl. No.: 18/613,345

(22) Filed: Mar. 22, 2024

(65) Prior Publication Data

US 2024/0328109 A1 Oct. 3, 2024

Related U.S. Application Data

(60) Provisional application No. 63/493,129, filed on Mar. 30, 2023.

(51) Int. Cl.
*E02D 5/38* (2006.01)
*E02D 5/60* (2006.01)

(52) U.S. Cl.
CPC .............. *E02D 5/38* (2013.01); *E02D 5/60* (2013.01); *E02D 2250/0007* (2013.01); *E02D 2250/0023* (2013.01); *E02D 2300/002* (2013.01); *E02D 2300/0026* (2013.01)

(58) Field of Classification Search
CPC ..... E02D 5/38; E02D 5/60; E02D 2250/0023; E02D 2250/0007; E02D 2300/002; E02D 2300/0026; E02D 2200/12; E04C 5/125; E04C 5/12; E04C 5/122; F16B 43/00
See application file for complete search history.

(56) References Cited

U.S. PATENT DOCUMENTS

| | | | | |
|---|---|---|---|---|
| 1,286,862 | A * | 12/1918 | Williams | F16B 43/001 411/371.1 |
| 3,150,465 | A * | 9/1964 | Johnson | E04D 3/30 52/537 |
| 4,940,198 | A * | 7/1990 | de Wilde | E04D 13/0722 248/48.1 |
| 5,586,417 | A | 12/1996 | Henderson et al. | |
| 5,826,387 | A | 10/1998 | Henderson et al. | |
| 6,672,023 | B2 | 1/2004 | Henderson et al. | |
| 7,533,505 | B2 | 5/2009 | Henderson et al. | |
| 7,618,217 | B2 | 11/2009 | Henderson et al. | |
| 7,707,797 | B2 | 5/2010 | Henderson et al. | |

(Continued)

*Primary Examiner* — Carib A Oquendo
(74) *Attorney, Agent, or Firm* — Dunlap Bennett & Ludwig PLLC (57) ABSTRACT

In concrete pier, pier with collar, and caps with helical, rock and soil anchor foundations, a corrugation filler mold is assembled onto the outer end of horizontally extending radial bolts to be post-tensioned. The filler mold receives the bolt outer end through a hole and fits into the adjacent corrugation trough on the outside surface of a corrugated metal pipe (CMP) defining an inside and/or outside surface of the pier foundation. The filler mold forms an enclosed cavity surrounding the radial bolt which can then be filled with cementitious material. When filled and cured, the filler mold and cementitious material stabilize the radial bolt in its horizontal position and the pier foundation during and after post-tensioning.

16 Claims, 5 Drawing Sheets

(56) References Cited

U.S. PATENT DOCUMENTS

| | | |
|---|---|---|
| 8,720,139 B2 | 5/2014 | Henderson et al. |
| 9,045,878 B2 | 6/2015 | Henderson et al. |
| 9,340,947 B2 | 5/2016 | Henderson et al. |
| 9,890,511 B1* | 2/2018 | Adams .................... E02D 5/808 |
| 11,274,412 B2 | 3/2022 | Henderson et al. |
| 2005/0129487 A1* | 6/2005 | Kelly ...................... F16B 43/00 |
| | | 411/533 |
| 2011/0272545 A1* | 11/2011 | Liu ......................... F24F 13/32 |
| | | 248/222.14 |
| 2017/0370400 A1* | 12/2017 | Chang .................. F16B 13/066 |

* cited by examiner

RADIAL BOLT CORRUGATED PIPE MOLD AND ASSEMBLY FOR CEMENTITIOUS FOUNDATIONS, AND METHOD FOR STABILIZATION

CROSS-REFERENCE TO RELATED APPLICATIONS

This application claims priority back to U.S. Provisional Patent Application No. 63/493,129, filed Mar. 30, 2023.

BACKGROUND OF THE INVENTION

1. Field of the Invention

The instant invention relates to a tensionless, concrete pier foundation i.e., lacking tensile stress, constructed in-situ and useful for supporting tall, heavy, and/or large structures. In particular, the invention relates to a tensionless concrete pier, collar, and helical, rock and soil anchor cap foundations containing corrugated metal pipe and horizontally extending post-tensioned, sleeved, radial bolts.

2. Description of Related Art

Tensionless, concrete pier foundations are known as disclosed in U.S. Pat. Nos. 5,586,417 (the '417 patent), 5,826,387, 6,672,023, 7,533,505, 7,618,217, 7,707,797 (the '797 patent), 8,720,139 (the '139 patent), 9,045,878 (the '878 patent), 9,340,947 (the '947 patent), and 11,274,412 (the '412 patent), the disclosures of which are expressly incorporated herein by reference as if fully set forth in their entirety.

The tensionless pier foundation disclosed in the '417 patent includes a concrete foundation formed as a cylinder having an outer boundary shell defined by an outer corrugated metal pipe (CMP) and an inner boundary formed by an inner CMP of smaller diameter than the outer CMP, with the upper ends of both CMPs being below the top of the foundation. Elongated high strength steel bolts run from an anchor flange near the bottom of the concrete cylinder vertically up through the concrete to extend above the upper end of the foundation and through a connecting flange for the supported structure to be connected on top of the foundation. The bolts are encased in sleeves or hollow tubes over a substantial portion of their vertical extent in the concrete to allow the encased portion of the bolts to be stretched and thus tensioned. With such tensioning of the bolts, the concrete is kept under constant compression while the bolts are always in static tension. Thus, the pier foundation in the '417 patent is referred to as "tensionless" due to the absence of tensile stress on the concrete.

The foundations disclosed in the '878 and '412 patents improve upon the '417 patent by, i.e., providing lateral reinforcement using nutted and sleeved radial bolts. In the '878 patent, the radial bolts are positioned to be generally horizontal and to extend laterally between at least an inner corrugated metal pipe embedded vertically in the foundation cap and an outer vertically embedded corrugated pipe that preferably defines the outer perimeter of the foundation cap. The CMPs provide vertical steel reinforcement around the perimeter of the post-tensioned concrete cap and internally therein.

In the '412 patent, the radially-extending horizontal bolts are tensioning bolts that, when post-tensioned after concrete pour and set-up, provide tension steel for minimizing bending of the outer CMP collar and enable the collar to share the overturning (upset) loads otherwise borne by the concrete pier alone. The structural collar can also support soil and rock anchor additions that extend vertically through the collar and into the underlying soil and/or rock substrate to increase the capacity and stiffness of the tensionless pier foundation. Sleeved, radial bolts are positioned and aligned by holes in the CMPs, extend horizontally beyond the outer, perimeter-defining CMP collar, are nutted on their threaded ends, and post-tensioned by torquing down the nuts against the outer surface of the CMP collar. Sleeving the radial bolts facilitates post-tensioning by isolating the bolts from the surrounding cementitious material of the concrete cap, in the same manner as disclosed for the post-tensioned vertical bolts in the '417 patent. As taught in the '878 patent, a plate is preferably positioned between the nut and the outer surface of the corresponding CMP wall to reinforce the pipe wall and distribute the pressure created by the nut upon tightening thereof.

However, even with the pressure distributing plate, or bearing plate, positioned between the nut and the outer surface of the CMP wall, the inventors of the present invention observed that torquing down the nuts against the outer CMP wall can still distort/crush/collapse one or more of the corrugation peaks at their points of contact with the plates. The collapse of one or more of the CMP corrugation peaks can prevent level (peak-to-peak) post-tensioning because the radial bolt bearing plate needs to uniformly distribute post-tension loads to the cured concrete and avoid bending of the radial bolt if the bearing plate is not perpendicular to the CMP wall. The inventors, therefore, recognized a need to prevent corrugation-peak collapse during post-tensioning of the radial bolts in concrete pier construction.

SUMMARY OF THE INVENTION

The present invention represents an elegant solution to the problem described in the preceding paragraph and provides improvement for stabilizing the outer end of the horizontally extending radial bolts used in cementitious foundation caps and collars, such as disclosed in the '878 and '412 patents, during post-tensioning of the radial bolts after the concrete for the cap or collar has been poured and cured. More specifically, the present invention provides an external filler mold to be assembled onto the outer end of the horizontally extended radial bolt to be post-tensioned, which filler mold forms a flat outer perimeter surface for engagement with and support for the radial bolt bearing plate. The filler mold is configured to fit into a corrugation on the outside surface of the outer CMP, or similar structure, to form an external cavity surrounding the radial bolt which then can be filled with cementitious material when the cementitious material is poured in forming the concrete cap or collar. A "corrugation" is herein defined as that part of the external surface of the outer CMP which extends between adjacent corrugation peaks and includes the corrugation trough therebetween. The external filler mold of the present invention is hereinafter referred to as a "corrugation filler mold".

The external cavity formed by the corrugation filler mold when positioned in a corrugation on the external surface of a CMP, and filled with cementitious material, prevents corrugation-peak collapse during post-tensioning of the encapsulated radial bolts and, thereby, results in horizontally level post-tensioned radial bolts in the concrete pier construction. The corrugation filler mold includes a rectangular, preferably square, mold top having a centrally located hole therethrough, which mold top bridges adjacent peaks on each side of the corrugation trough, and two wings which project perpendicularly from opposing edges of the mold top, respectively, each wing completely filling the corrugation to produce the external corrugation filler mold cavity bounded by the mold top, the two wings, and the CMP corrugation. The mold top hole is sized to snugly receive the outer end of the corresponding radial bolt therethrough.

The implementation of the corrugation filler mold around the portion of the radial bolt in the CMP corrugation serves to stabilize the outer end of the radial bolt and maintain its horizontal positioning, as well as stabilizing the finished concrete foundation. More specifically, once the corrugation filler mold is positioned on the radial bolt and against the adjacent corrugation of the CMP and the cementitious material is poured, the cementitious material fills the cavity or open space inside the mold against the corrugation wall. After the cementitious material sets up, the outer end of the radial bolt is stabilized in its desired horizontal position during bolt post-tensioning and subsequent use of the finished concrete foundation.

In another aspect, the present invention further comprises a horizontally extending radial bolt passing from inside an inner corrugated metal pipe through a hole in the inner CMP, through an enlarged hole in the trough of the outer CMP, through the centrally located hole in the corrugation filler mold top, and nutted on the end of the radial bolt having passed through the hole in the corrugation filler mold top. The radial bolt is sleeved from the inner CMP, through the hole in the trough of the outer CMP, to the mold top of the corrugation filler mold, such that one end of the sleeve abuts the inner CMP surrounding the hole therethrough and the other end of the sleeve abuts the underside of the corrugation filler mold top surrounding the central hole therethrough. The invention preferably further comprises a radial bolt bearing plate disposed between the nutted end of the radial bolt and the corrugation filler mold top and having a central hole, aligned with the central hole in the corrugation filler mold top, through which the radial bolt passes.

In yet another aspect, the present invention also provides an improvement in a tensionless concrete pier foundation having sleeved radial bolts extending horizontally through the concrete foundation nutted against the interior of an inner corrugated metal pipe and the exterior of an outer corrugated metal pipe, the sleeved radial bolts being post tensioned after the concrete foundation has been poured and cured, the improvement wherein the foundation further includes, disposed between the nut and the outer corrugated metal pipe, a corrugation filler mold having a rectangular top bridging adjacent corrugation peaks and having a central hole through which the radial bolt passes and two wings projecting normally from opposing edges of the plate, respectively, each wing completely filling the corrugation to produce a mold cavity bounded by the mold top, the two wings, and the CMP corrugation, wherein the sleeved radial bolt passes through an enlarged hole in the trough between the adjacent corrugation peaks of the outer CMP, thus leaving a space between the sleeved radial bolt and the enlarged hole, such that cementitious material fills the mold cavity through the space between the sleeved radial bolt and the enlarged CMP hole when the cementitious material is poured for the concrete foundation. Once cured, the cementitious material in the filled mold cavity serves to prevent corrugation-peak collapse, concrete cracking, and post-tension load loss during post-tensioning of the radial bolts and, thereby, results in level post-tensioned radial bolts in the concrete pier foundation.

In still another aspect, the present invention also provides a method for stabilizing the outer ends of horizontal radial bolts which extend through a corrugation trough of an outer CMP and/or an inner CMP of a cementitious pier foundation by installing a corrugation filler mold on each radial bolt in its corrugation trough. The corrugation filler mold forms a cavity or open space between the filler mold and the corrugation trough to thereby surround the radial bolt. When the cavity or open space is filled with cementitious material, the cementitious material surrounds the radial bolt inside said cavity. When the cementitious material cures, the filler mold and cementitious material stabilize the radial bolt and the pier foundation for post-tensioning of the radial bolts and subsequent use and operation of the pier foundation.

Accordingly, it is an object of the present invention to provide a corrugation filler mold which serves to overcome the problem of corrugation peak collapse in the outer CMP and cementitious foundation cap or collar cracking during post-tensioning of the horizontally extending radial bolts.

It is another object of the present invention to provide a corrugation filler mold in accordance with the preceding object which includes a generally rectangular flat mold top having a centrally located hole therethrough and a pair parabola-shaped wings which extend perpendicularly from opposite sides of the rectangular flat mold top, which wings are shaped to engage the outside surface of a corrugation in the outer CMP on opposite sides of the radial bolt end which projects outside the CMP for post-tensioning.

It is a further object of the present invention to provide a corrugation filler mold which, in combination with an outside surface of a corrugation of the outer CMP, forms an external cavity around the projecting end of a radial bolt that can be filled with cementitious material during pouring of the foundation cap or collar.

It is still another object of the present invention to provide a corrugation filler mold in accordance with the preceding object which, following cementitious material pour and cure, stabilizes the projecting end of the radial bolt during post-tensioning as a result of the cured cementitious material in the external cavity.

It is still another object of the present invention to provide a corrugation filler mold as previously described in combination with a horizontally extending radial bolt which passes through an enlarged hole in a corrugation trough of the outer CMP, through the centrally located holes in the corrugation filler mold top and bearing plate, and nutted at the end of the radial bolt, in which the radial bolt is sleeved from an inner CMP through the hole in the trough of the outer CMP, to the mold top of the corrugation filler mold, such that the outer end of the sleeve extends through the enlarged hole in the corrugation trough and abuts the underside of the corrugation filler mold top surrounding the central hole therethrough.

It is still a further object of the present invention to provide an improvement in tensionless concrete pier foundations having sleeved radial bolts extending horizontally through the concrete foundation, wherein the sleeved radial bolts are post-tensioned after the concrete foundation is poured and cured, the improvement including a corrugation filler mold as previously described in combination with the outside surface of a CMP corrugation, wherein the sleeved radial bolt passes through an enlarged hole in the trough between adjacent corrugation peaks of the outer CMP, thus leaving a space between the sleeved radial bolt and the enlarged hole, such that cementitious material fills the mold cavity through the aforesaid space when cementitious material is poured for the concrete foundation.

It is yet another object of the present invention to provide a method for stabilizing the outer ends of horizontal radial bolts which extend through a corrugation trough in an outer CMP and/or an inner CMP of a cementitious foundation by installing a corrugation filler mold on each radial bolt in its corrugation trough which forms a cavity or open space between the filler mold and the corrugation trough and surrounds the radial bolt so that when the cavity or open space is filled with cementitious material, and the cementitious material cures, the filler mold and cementitious material stabilize the outer end of the radial bolt in its horizontal position for post-tensioning and subsequent use and operation of the foundation.

The above together with other objects and advantages of the present invention which will become subsequently apparent reside in the details of construction and operation as more fully hereinafter disclosed and claimed, reference being had to accompanying drawings forming a part hereof, wherein like numerals refer to like parts throughout.

DETAILED DESCRIPTION OF THE PREFERRED EMBODIMENTS

Figure 1A:
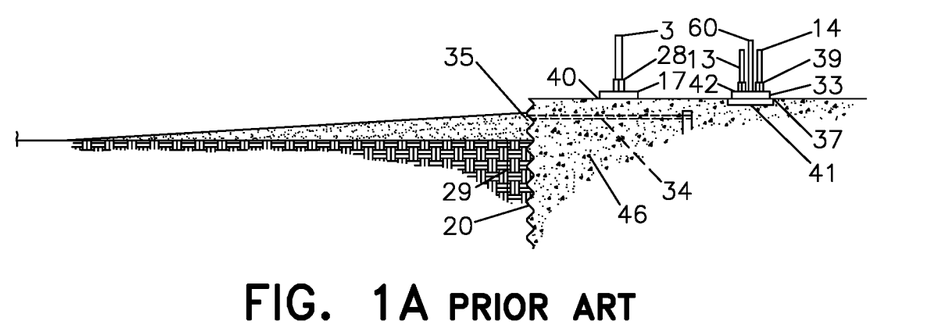
FIG. 1A is an enlarged fragmental view, partly in section, of a completed cementitious foundation cap as shown in FIG. 4 of the '878 patent, and labelled "PRIOR ART".
Figure 1B:
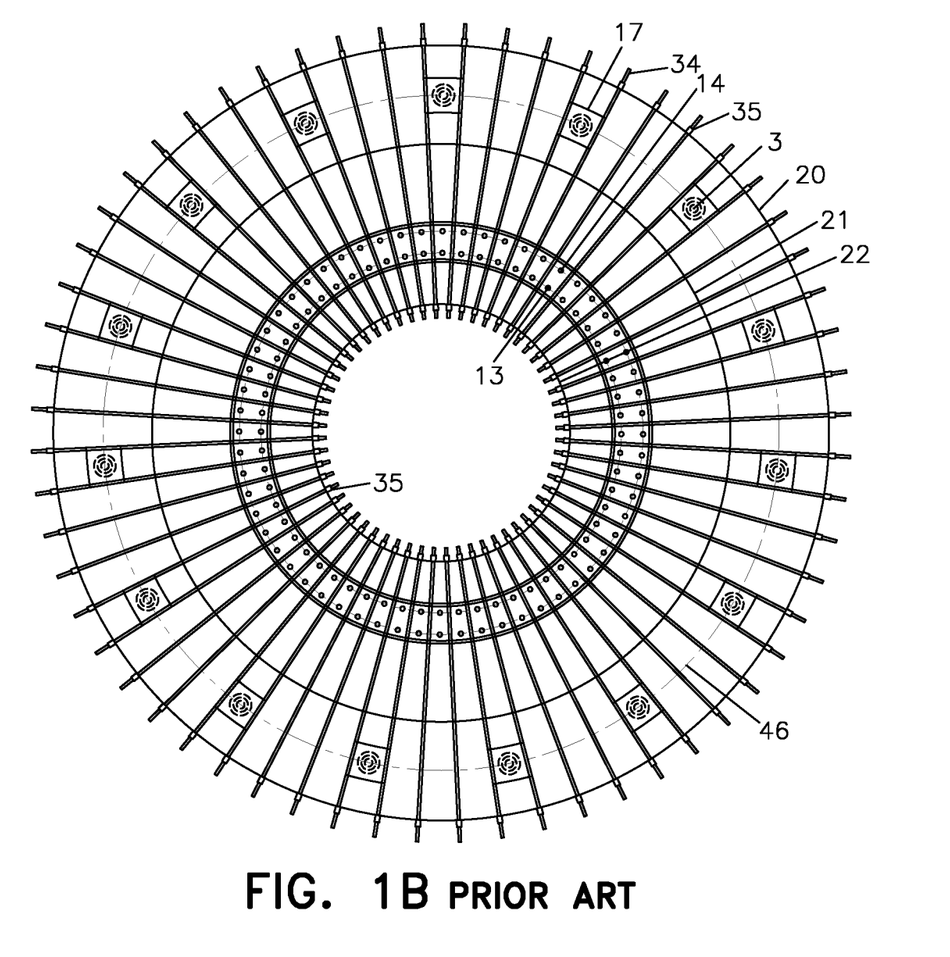
FIG. 1B is a top plan view of the horizontally extending radial bolts for a cementitious foundation cap, as shown in FIG. 3 of the '878 patent, prior to concrete being poured, and labelled "PRIOR ART".

Turning first to FIGS. 1A and 1B, as exemplified by the prior art '878 patent, radially extending bolts 34 are positioned horizontally between pairs of anchor bolts 13, 14, and helical anchor bolts 3. The radial bolts 34 preferably are placed near both the top and bottom of the concrete foundation cap 46. The radial bolts pass through internal corrugated metal pipes 21 and 22 which provide hoop and vertical steel reinforcement, as well as bolt support before the foundation cap 46 pour is made. The horizontally extending radially bolts 34 are nutted 35 outside the perimeter defining corrugated metal pipe 20 and inside the inner-most corrugated metal pipe 22. The radial bolts 34, which are preferably sleeved, are post-tensioned from the perimeter of the concrete foundation cap 46 following pour and cure of the concrete foundation cap 46.

While the cementitious foundation cap shown in the prior art '878 patent utilizes helical anchor bolts 3, the present invention is applicable to rock and soil anchor cap foundations as well as tensionless concrete piers and collars, as well as will be readily understood by those skilled in the art.

With reference to drawing FIGS. 2-6, the corrugation filler mold of the present invention is designated generally by reference numeral 100 and the relevant section of the outer corrugated metal pipe (CMP) is designated generally by reference numeral 110. The corrugation filler mold 100 includes a generally flat rectangular mold top 112, preferably square as shown, which has a centrally located circular hole 114 to snugly receive the outer end of radial bolt 102 therethrough. In a preferred embodiment, the square mold top 112 is 6"×6". Extending perpendicularly from opposite sides of the flat mold top 112 are a pair of parabola-shaped (wave-shaped) wings 116A and 116B which are configured to fit tightly against the corrugation, designated generally by reference numeral 118, of the outer CMP 110 from peak 110A to peak 110B.

Figure 3:
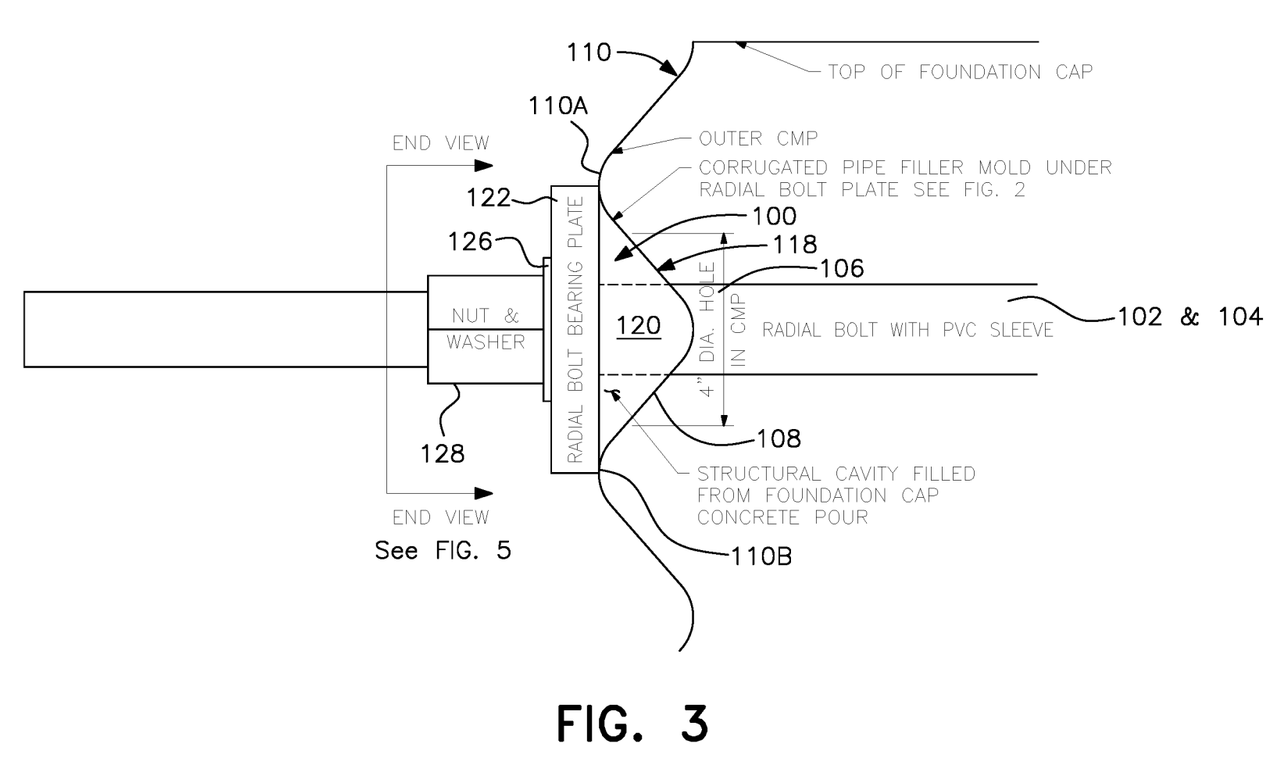
FIG. 3 is a schematic side view of the preferred corrugation filler mold shown in FIG. 2 assembled in a corrugation of an outer CMP, and held in place by a radial bolt bearing plate and nut and washer on the outer end of a PVC sleeved radial bolt, prior to concrete pour, in accordance with the present invention.
Figure 4:
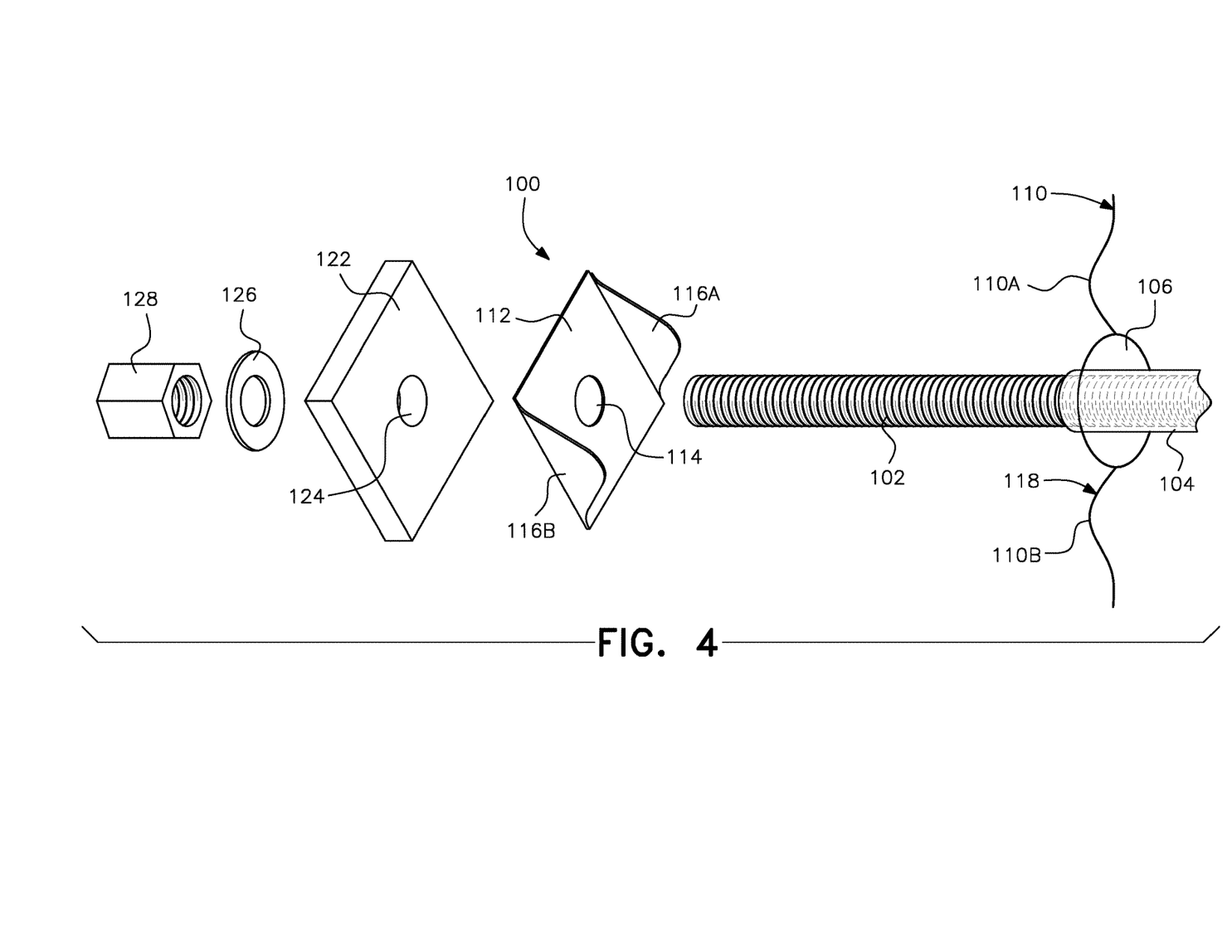
FIG. 4 is an exploded perspective view showing the assembly of the corrugation filler mold of the present invention together with its corresponding components as shown in FIG. 3, according to the present invention.
Figure 5:
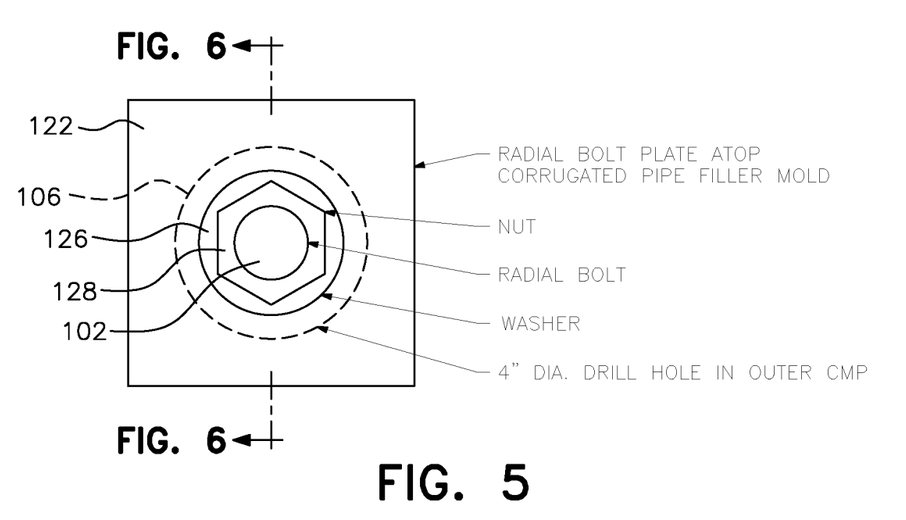
FIG. 5 is an end view detailing part of FIG. 3.
Figure 6:
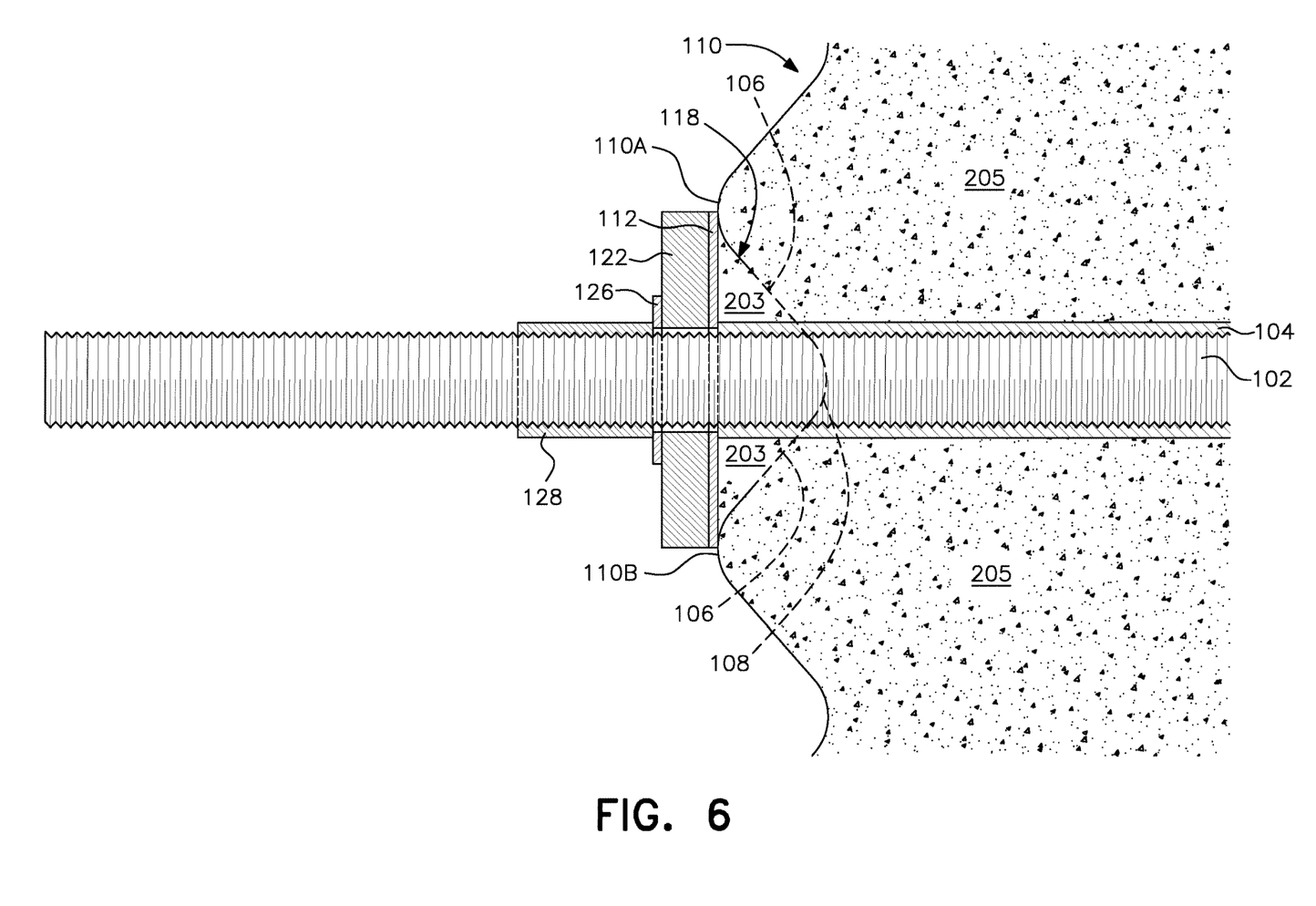
FIG. 6 is a cross-sectional view taken along the cross-section line 6-6 shown in FIG. 5, showing the assembly of the corrugation filler mold of the present invention together with its corresponding components, after the concrete pour and concrete has filled the mold cavity formed by the corrugation filler mold against the outside surface of an outer CMP corrugation, in accordance with the present invention.

As shown in FIGS. 3, 4 and 6, the end of threaded radial bolt 102 in PVC sleeve 104 passes through hole 106 in corrugation trough 108 between adjacent corrugation peaks 110A and 110B of corrugated metal pipe 110. The end of sleeve 104 preferably abuts the underside of the mold top 112 and surrounds the hole 114 of the corrugation filler mold 100, as shown in FIG. 6. The parabola-shaped wings 116A and 116B of the mold 100 fill the corrugation 118 between peaks 110A and 110B to form a mold cavity or open space 120 (see FIG. 3) bounded by the mold top 112 and wings 116A and 116B and the outside surface of the corrugation 118 between the adjacent peaks 110A and 110B bridged by the mold top 112. Threaded radial bolt 102 extends past corrugation filler mold top 112 through hole 114, then past radial bolt bearing plate 122 through hole 124, and then through washer 126 with nut 128 threaded onto the exposed end of the radial bolt 102 and to be torqued down.

While a separate radial bolt bearing plate 122 is preferred, the radial bolt bearing plate and the corrugation filler mold top 112 can be formed as a single unit, i.e., with the corrugation filler mold top having sufficient thickness to act as the radial bolt bearing plate, as well.

Figure 2:
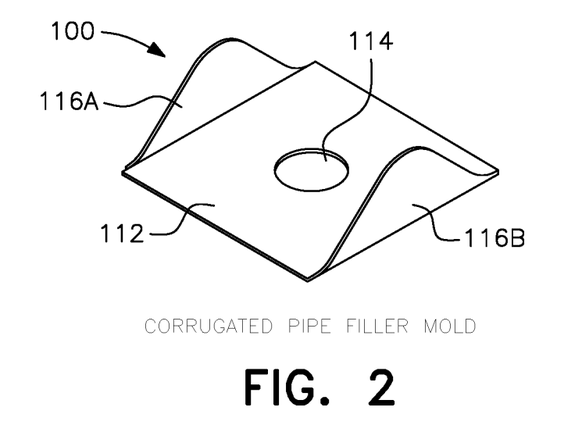
FIG. 2 is a perspective view of a preferred corrugation filler mold according to the present invention.

The corrugation filler mold 100 can be made by forming a flat piece of steel having parabola-shaped opposing sides, and then bending down the parabola-shaped sides to form the rectangular mold top 112 and the parabola-shaped wings 116A and 116B.

Radial bolt sleeve 104 abuts the underside of the corrugation filler mold top 112 in order to prevent concrete from getting inside the sleeve, i.e., between the sleeve 104 and the radial bolt 102, which can interfere with post-tensioning. The sleeve 104 is preferably made of PVC tubing, but any other tubing or material can be used so long as it serves to prevent adhesion of the radial bolt 102 to the surrounding cementitious material 203, which could interfere with the post-tensioning of the radial bolt after curing of the cementitious material 203 and 205 (see FIG. 6).

In a preferred embodiment as disclosed, the radial bolt 102 has a diameter of 1.5", and the hole 114 in the mold top 112 and the hole 124 in the radial bolt bearing plate 122 are approximately 2" diameter holes to snugly receive the radial bolt therethrough while capturing the sleeve 104 against the underside of mold top 112 surrounding the hole 114. In contrast, the hole 106 in the trough 108 of the corrugation 105 has a preferred diameter of 4", i.e. approximately twice the diameter of the hole 114. Certainly, different size radial bolts, and corresponding size holes 114 and 124 and washers 126 and nuts 128 can be used. However, the size of the trough hole 106 must be substantially larger in order to allow passage of the cementitious material into the mold cavity during cementitious material pour. It is believed that the size of opening 106 should be at least between about 1.5 and about 3.0 times the size of the opening 114 in the corrugation filler mold 100.

While it is preferred that the corrugation filler mold 100 of the present invention span only a single corrugation of the outer CMP between adjacent corrugation peaks 110A and 110B, it is possible that the mold top 112 could be elongated to span adjacent corrugations without departing from the present invention.

The corrugation filler mold 100 used in accordance with the instant invention encases cementitious material (corrugation filler) to provide a level surface perpendicular to the radial bolt across the corrugation (peak to peak) to provide even distribution of external post-tensioning bearing loads.

The corrugation filler mold 100 can be made of steel, aluminum, fiber glass, plastic, or composites.

The corrugation filler mold 100 can be fabricated using molds, sheet cutouts and bending, or other forming methodology.

A steel corrugation filler mold can be formed at various thicknesses, but a 14 gauge thickness is typically adequate. However, greater or lesser thicknesses can be utilized depending upon the material selected for the corrugation filler mold.

Cementitious material (mold fillers) can be injected through the backside (interior) of the CMP corrugation 118 via hole 106 to fill the voided area (cavity) 120 between the CMP corrugation and the corrugation filler mold 100.

In an alternate embodiment, the corrugation filler mold 100 can be filled externally before the cementitious material is poured to form the concrete cap or collar. In one embodiment, once the corrugation filler mold 100 and radial bolt bearing plate 122 are in place on the protruding end of the radial bolt 102, along with nut 128 and washer 126, a hole or injection port can be drilled on site through the bearing plate 122 and the mold top 112 of the corrugation filler mold 100. Grout or similar filler material can then be easily injected into mold cavity 120 and allowed to cure around the surrounded portion of the radial bolt 102 and sleeve 104 before the cementitious material is poured for the concrete foundation. A typical grout would be a simple mixture of cement and water. In this embodiment, the hole 106 in the CMP trough can be reduced in size to about ¼" larger than the PVC sleeve 104. In another embodiment, the hole or injection port through the bearing plate 122 and mold top 112 can be predrilled.

The term "radial bolt" as used herein encompasses steel rebar, fiberglass, composites, steel strands, and steel bolts that can be extended through the hole 106 in the backside of the CMP corrugation and through the 114 hole in the corrugation filler mold 100.

The radial bolts extend beyond the corrugation filler mold to allow post-tensioning, securing, and continuation.

The radial bolt bearing plate 122 having a hole therethrough is set atop the corrugation filler mold 100 so that the radial bolt 102 extends through the hole 124 in the bearing plate.

Radial bolts are secured in position to reinforce (post-tension) cementitious material on the inside of the outer CMP by nut and washer or a wedge, or the like.

The corrugation filler mold is utilized to facilitate bearing resistance for radial bolts with reinforcing (post-tensioned) tensile loads for cured cementitious material within the outer CMP.

The present invention also contemplates the combination of the corrugation filler mold according to the present invention with the requisite cementitious foundation having a corrugated metal pipe or similar structure defining its outer and/or inner perimeter and horizontally extending radial bolts embedded in the cementitious foundation and extending outwardly from the corrugated metal pipe through holes, which combination forms an external mold cavity or open space surrounding a portion of the horizontal extending radial bolt outer end against the outer side in a corrugation of the CMP or similar structure. When the external mold cavity is filled with cementitious material and cured, the filler mold and cured cementitious material stabilize the outer end of the radial bolt in its horizontal position for post-tensioning and subsequent use and operation of the pier foundation.

The present invention, in addition, provides a method for stabilizing the horizontal radial bolts by installing a corrugation filler mold on the ends of the radial bolts in corrugation troughs of the outer and/or inner CMP of the cementitious foundation. The corrugation filler mold against the corrugation trough forms a cavity or open space surrounding the radial bolt. When the cavity or open space is filled with cementitious material, and the cementitious material has cured around the radial bolt inside the cavity, the filler mold and cementitious material stabilize the radial bolts and the cementitious foundation during post-tensioning of the bolts and subsequent use and operation of the foundation.

As indicated herein previously, the corrugation filler mold of the present invention is applicable to tensionless concrete pier, collar, and helical, rock and soil anchor cap foundations, and is not limited to concrete or cementitious pier foundations only. Hence, where the text herein refers to concrete or cementitious pier foundations, it is intended to include collar and helical, rock and soil anchor cap foundations, as well.

The foregoing is considered as illustrative of the principles of the invention. Further, modifications and changes will readily occur to those skilled in the art. As such, it is not desired to limit the invention to the exact construction and operation shown and described; all suitable modifications and equivalents may be resorted to falling within the scope of the invention.

What is claimed is:

1. A corrugation filler mold comprising a generally rectangular flat mold top having a generally centrally located hole sized to snugly receive an outer end of a horizontally extending radial bolt of a cementitious foundation therethrough and a pair of parabola-shaped wings extending perpendicularly from opposite sides of the rectangular flat mold top, which wings are configured to engage a corrugation of an outer corrugated metal pipe of said cementitious foundation and form a external mold cavity surrounding a portion of said horizontally extending radial bolt outside said corrugation.

2. The corrugation filler mold of claim 1, wherein said flat mold top forms an outer perimeter surface for engagement with and support for a radial bolt bearing plate.

3. The corrugation filler mold of claim 1, wherein the mold is made of steel, aluminum, fiberglass, plastic or composites.

4. The corrugation filler mold of claim 1, wherein the outer end of the horizontally extending radial bolt is stabilized for post-tensioning of the radial bolt after the external mold cavity has been filled with cementitious material and the cementitious material has cured.

5. The corrugation filler mold of claim 1, wherein the radial bolt is selected from steel rebar, steel strands, fiberglass, composites, and steel bolts, and the generally centrally located hole of the mold top is sized to snugly encompass the radial bolt.

6. In combination, a cementitious foundation having a corrugated metal pipe or similar structure defining its outer or inner perimeter and horizontally extending radial bolts embedded in the cementitious foundation and extending outwardly from the corrugated metal pipe through holes and the corrugation filler mold of claim 1 which forms an external mold cavity surrounding a portion of the horizontal extending radial bolt outer end against the outer side of a corrugation in said corrugated metal pipe or similar structure, which external mold cavity is filled with cementitious material.

7. The combination of claim 6, wherein the horizontally extending radial bolts include PVC sleeves which extend from inside the cementitious foundation and into the external mold cavity and terminate adjacent an underside of the corrugation filler mold top.

8. The combination of claim 7, wherein the holes in the corrugated metal pipe through which the radial bolt extends are oversized and the external mold cavity is filled with cementitious material during the pouring of the cementitious foundation.

9. The combination of claim 7, wherein the external mold cavity is filled with cementitious material and cured prior to pouring of the cementitious foundation.

10. The combination of claim 6, wherein a radial bolt bearing plate is positioned on top of the rectangular flat mold top of said corrugation filler mold, and a nut and washer are positioned outside said radial bolt bearing plate in order to post-tension the horizontally extending radial bolt after the concrete of said cementitious foundation has cured.

11. The combination of claim 6, wherein the radial bolts are steel or other metal, composites, fiberglass or similar rebar, strands, or bolts.

12. The combination of claim 8, wherein the oversized holes are at least between about 1.5 and about 3.0 times the size of the generally centrally located hole of the corrugation filler mold top.

13. The combination of claim 10, wherein the post-tensioning of the radial bolt distributes post-tension load to the radial bolt bearing plate and evenly across the cured cementitious material within the corrugation filler mold cavity to prevent corrugation peak collapse, concrete cracking and post-tension loss in the radial bolts.

14. A method for stabilizing the outer end of a horizontal radial bolt extending through a corrugation trough of an outer corrugate metal pipe of a cementitious foundation, the method comprising:
  installing a corrugation filler mold in said corrugation trough which defines an open space between said corrugation filler mold and said corrugation trough and surrounding said radial bolt;
  filling the open space with cementitious material to surround said radial bolt therein; and
  allowing said cementitious material to cure thereby to stabilize the outer end of said radial bolt in a horizontal position during its post-tensioning and use of said cementitious foundation.

15. The method in accordance with claim 14, wherein a hole in the corrugated metal pipe through which the radial bolt extends is oversized and the corrugation filler mold is filled with cementitious material during the pouring of the cementitious foundation.

16. The method of claim 14, wherein said open space is filled with cementitious material and cured prior to pouring of the cementitious foundation.

* * * * *